(12) United States Patent
Keller et al.

(10) Patent No.: US 9,045,374 B2
(45) Date of Patent: Jun. 2, 2015

(54) FORMATION OF SILICON CARBIDE-SILICON NITRIDE NANOPARTICLE CARBON COMPOSITIONS

(71) Applicants: Teddy M. Keller, Fairfax Station, VA (US); Andrew Saab, Washington, DC (US); Matthew Laskoski, Springfield, VA (US)

(72) Inventors: Teddy M. Keller, Fairfax Station, VA (US); Andrew Saab, Washington, DC (US); Matthew Laskoski, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/281,008

(22) Filed: May 19, 2014

(65) Prior Publication Data
US 2014/0329663 A1 Nov. 6, 2014

Related U.S. Application Data

(60) Division of application No. 13/792,838, filed on Mar. 11, 2013, now Pat. No. 8,778,488, which is a continuation-in-part of application No. 13/779,771, filed on Feb. 28, 2013, now Pat. No. 8,815,381, which is a continuation-in-part of application No. 13/768,219, filed on Feb. 15, 2013, now Pat. No. 8,865,301, which is a continuation-in-part of application No. 13/749,794, filed on Jan. 25, 2013, now Pat. No. 8,822,023.

(60) Provisional application No. 61/693,930, filed on Aug. 28, 2012, provisional application No. 61/669,201, filed on Jul. 9, 2012, provisional application No. 61/640,744, filed on May 1, 2012, provisional application No. 61/590,852, filed on Jan. 26, 2012, provisional application No. 61/640,744, filed on May 1, 2012, provisional application No. 61/669,201, filed on Jul. 9, 2012, provisional application No. 61/693,930, filed on Aug. 28, 2012.

(51) Int. Cl.
| | | |
|---|---|---|
| C04B 35/00 | (2006.01) | |
| C04B 35/573 | (2006.01) | |
| C01B 31/36 | (2006.01) | |
| C04B 35/52 | (2006.01) | |
| C04B 35/524 | (2006.01) | |
| C04B 35/76 | (2006.01) | |
| C04B 35/80 | (2006.01) | |
| C04B 35/83 | (2006.01) | |
| B82Y 30/00 | (2011.01) | |
| C04B 35/591 | (2006.01) | |

(52) U.S. Cl.
CPC ............... *C04B 35/573* (2013.01); *C01B 31/36* (2013.01); *C04B 35/522* (2013.01); *C04B 35/524* (2013.01); *C04B 35/76* (2013.01); *C04B 35/806* (2013.01); *C04B 35/83* (2013.01); *C04B 2235/383* (2013.01); *C04B 2235/3834* (2013.01); *C04B 2235/3873* (2013.01); *C04B 2235/421* (2013.01); *C04B 2235/422* (2013.01); *C04B 2235/428* (2013.01); *C04B 2235/48* (2013.01); *C04B 2235/5216* (2013.01); *C04B 2235/5248* (2013.01); *C04B 2235/526* (2013.01); *C04B 2235/5288* (2013.01); *C04B 2235/5436* (2013.01); *C04B 2235/6562* (2013.01); *C04B 2235/762* (2013.01); *C04B 2235/767* (2013.01); *C04B 2235/77* (2013.01); *C04B 2235/781* (2013.01); *C04B 2235/80* (2013.01); *C04B 2235/95* (2013.01); *B82Y 30/00* (2013.01); *C04B 35/52* (2013.01); *C04B 35/591* (2013.01)

(58) Field of Classification Search
CPC .............................. C04B 35/573; C01B 31/36
USPC .................................................. 501/88, 90, 92
See application file for complete search history.

(56) References Cited

U.S. PATENT DOCUMENTS

| | | | | |
|---|---|---|---|---|
| 5,730,915 A | * | 3/1998 | Cornie .......................... | 264/29.1 |
| 5,980,853 A | * | 11/1999 | Keller et al. .................. | 423/448 |
| 6,051,167 A | * | 4/2000 | Withers et al. ................ | 264/29.2 |
| 7,658,781 B1 | * | 2/2010 | Waggoner et al. ............. | 75/236 |

\* cited by examiner

*Primary Examiner* — Kuo-Liang Peng
(74) *Attorney, Agent, or Firm* — US Naval Research Laboratory; Joseph T. Grunkemeyer

(57) ABSTRACT

A composition having nanoparticles of silicon carbide and a carbonaceous matrix or silicon matrix. The composition is not in the form of a powder. A composition having silicon and an organic compound having a char yield of at least 60% by weight or a thermoset made from the organic compound. A method of combining silicon and the organic compound and heating to form silicon carbide or silicon nitride nanoparticles.

19 Claims, 14 Drawing Sheets

60 —

70 —

FORMATION OF SILICON CARBIDE-SILICON NITRIDE NANOPARTICLE CARBON COMPOSITIONS

This application is a divisional application of U.S. Nonprovisional patent application Ser. No. 13/792,838, filed on Mar. 11, 2013, which claims the benefit of U.S. Provisional Application No. 61/693,930, filed on Aug. 28, 2012, and which is a continuation in part application of U.S. Nonprovisional patent application Ser. No. 13/779,771, filed on Feb. 28, 2013, which is a continuation in part application of U.S. Nonprovisional patent application Ser. No. 13/768,219, filed on Feb. 15, 2013, which is a continuation in part application of U.S. Nonprovisional patent application Ser. No. 13/749,794, filed on Jan. 25, 2013, which claims priority to U.S. Provisional Application No. 61/590,852, filed on Jan. 26, 2012, U.S. Provisional Application No. 61/640,744, filed on May 1, 2012, U.S. Provisional Application No. 61/669,201, filed on Jul. 9, 2012, and U.S. Provisional Application No. 61/693,930, filed on Aug. 28, 2012. These applications and all other publications and patent documents referred to throughout this nonprovisional application are incorporated herein by reference.

TECHNICAL FIELD

The present disclosure is generally related to synthesis of silicon carbide and silicon nitride.

DESCRIPTION OF RELATED ART

Silicon carbide is one of the most important carbides used in industry. Silicon carbide exists in two main crystal modifications: the hexagonal ($\alpha$-SiC) and cubic ($\beta$-SiC). The hexagonal modification is a "giant molecule", constructed in accordance with the principle of a unique structurally directed polymerization of simple molecules. The layers of carbon and silicon atoms in $\alpha$-SiC are arranged in various ways with respect to one another, thus forming many structural types. The transition from $\beta$-SiC to $\alpha$-SiC occurs at 2100°-2300° C. (the reverse transition is usually not observed). Silicon carbide is refractory (melts with decomposition at 2830° C.) and is extremely hard being second only to diamond and boron carbide, $B_4C$. It is brittle and its density is 3.2 g/cm$^3$. Silicon carbide is stable in various chemical media even at high temperatures.

Silicon carbide can be produced by heating silica sand ($SiO_2$) and carbon by the Acheson process to high temperatures in a high temperature furnace. In an Acheson graphite electric resistance furnace, the produced SiC is suitable for grinding and cutting applications at temperatures above 2200° C. A furnace run can last several days, during which temperatures vary from 2200° to 2700° C. in the core to about 1400° C. at the outer edge. The energy consumption exceeds 100,000 kilowatt-hours per run. At the completion of the run, the product consists of a core of green to black SiC crystals loosely knitted together, surrounded by partially or entirely unconverted raw material. The lump aggregate is crushed, ground, and screened into various sizes appropriate depending on the end use. Widely used as an abrasive material, SiC is marketed under such familiar trade names as CARBORUNDUM® and CRYSTOLON®. It is heat resistant, decomposing when heated to about 2700° C. It is used in refractory applications, e.g., rods, tubes, firebrick, and in special parts for nuclear reactors. Very pure silicon carbide is white or colorless; crystals of it are used in semiconductors for high-temperature applications. Silicon carbide fibers, added as reinforcement to plastics or light metals, impart increased strength and stiffness.

For special applications, silicon carbide is produced by a number of advanced processes. Reaction-bonded silicon carbide is produced by mixing SiC powder with powdered carbon and a plasticizer, forming the mixture into the desired shape, burning off the plasticizer, and then infusing the fired object with gaseous or molten silicon, which reacts with the carbon to form additional SiC. Wear-resistant layers of SiC can be formed by chemical vapor deposition, a process in which volatile compounds containing carbon and silicon are reacted at high temperatures in the presence of hydrogen in a closed reactor. For advanced electronic applications, large single crystals of SiC can be grown from the vapor and then sliced into wafers much like silicon for fabrication into solid-state devices. For reinforcing metals or other ceramics, SiC fibers can be formed in a number of ways, including chemical vapor deposition and the firing of silicon-containing polymer fibers.

In shaped components, SiC is brittle and is fabricated from the powder by the sintering technique at high temperature and pressure. The conventional carbothermal reduction method for the synthesis of SiC powders is an excessive demanding energy process and leads to a rather poor quality material. Grains of silicon carbide can be bonded together by sintering of the produced powder from reaction of silica with carbon to form very hard ceramics, which are widely used in applications requiring high endurance, such as car brakes, car clutches, and ceramic plates in bulletproof vests. In addition, it has low impact resistance and low fracture toughness.

Electronic applications of silicon carbide as light emitting diodes and detectors in early radios were first demonstrated around 1907, and currently SiC is widely used in high temperature-high voltage semiconductor electronics. Large single crystals of silicon carbide can be grown by the Lely process, in which SiC powder is sublimated in an argon atmosphere at 2500° C. and redeposited into flake-like single crystals on a slightly colder substrate. Current SiC devices include Schottky barrier diodes, solid state circuit breakers, power modules, and custom SiC integrated circuits. Currently, SiC Schottky diodes are the only SiC power devices sold in large volumes.

Several recent technical and market reports have recognized silicon carbide power electronics as a potential technology for solar and wind turbine power converters. The primary benefits of SiC-based power devices include low losses, high temperature tolerance, and fast switching. In essence, SiC can be exploited to reduce generation losses and increase net energy production. The low losses and high temperature tolerance can also be used to improve the reliability of the converter and reduce the thermal management requirements. Moreover, fast switching has the potential to reduce the filtering passive component size and cost and thus, the total cost of the system.

Ceramic materials such as silicon carbide and silicon nitride continue to be used to fabricate specific high temperature automobile engine components and brakes for automobile vehicles and aircraft and as a way to improve the performance of gas-turbine engines for aircraft to lengthen their life span and reduce their fuel consumption. The challenges involved have been considerable. The material in modern turbines must survive temperatures of more than 1100° C. for thousands of hours, high thermal stresses caused by rapid temperature changes and large temperature gradients, high mechanical stresses, isolated impact and contact stresses, low- and high-frequency vibrational loading, chemical reactions with adjacent components, oxidation, corrosion, and time- and stress-dependent effects such as creep, stress rupture, and cyclic fatigue. Early ceramic materials were not able to withstand these conditions and early turbine-component designs were not compatible with brittle materials. Technological evolution has to be made over a broad front and progress has been slow. Silicon carbide and silicon nitride are currently heavily used for turbine engine applications due to their superb thermal shock resistance, largely due to a combination of low thermal expansion, high strength, and moderate thermal conductivity.

Ceramic turbine components are fabricated starting with powders of the raw materials of which SiC is a major source. The quality of the final part depends on the quality of the starting powder and on each step in the fabrication process under sintering conditions. Sintered silicon nitride and silicon carbide materials have become the primary candidates for turbine engine programs. These materials have intermediate strengths between reaction-bonded and hot-pressed materials, but they have the potential to be fabricated to near-net shape at costs competitive with metal turbine components. Most of the effort has focused on injection-molding and slip-casting radial turbine rotors, scrolls, and other turbine components. More recently, researchers have demonstrated that silicon nitride and silicon carbide can be densified by pressureless sintering if the starting powders are of very small particle size.

BRIEF SUMMARY

Disclosed herein is a composition comprising: nanoparticles of silicon carbide; and a carbonaceous matrix or silicon matrix. The composition is not in the form of a powder.

Also disclosed herein is a composition comprising: silicon; and an organic component selected from an organic compound having a char yield of at least 60% by weight and a thermoset made from the organic compound.

Also disclosed herein is a method comprising: combining silicon and an organic compound having a char yield of at least 60% by weight to form a precursor mixture.

Also disclosed herein is a method comprising: providing a precursor mixture of silicon and an organic compound; heating the precursor mixture in an inert atmosphere at elevated pressure and at a temperature that causes polymerization of the organic compound to a thermoset to form a thermoset composition; and heating the thermoset composition in an inert atmosphere, argon, nitrogen, or vacuum at a temperature that causes formation of a ceramic comprising nanoparticles of silicon carbide or silicon nitride in a carbonaceous matrix or silicon matrix. The organic compound has a char yield of at least 60% by weight when heated at the elevated pressure.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
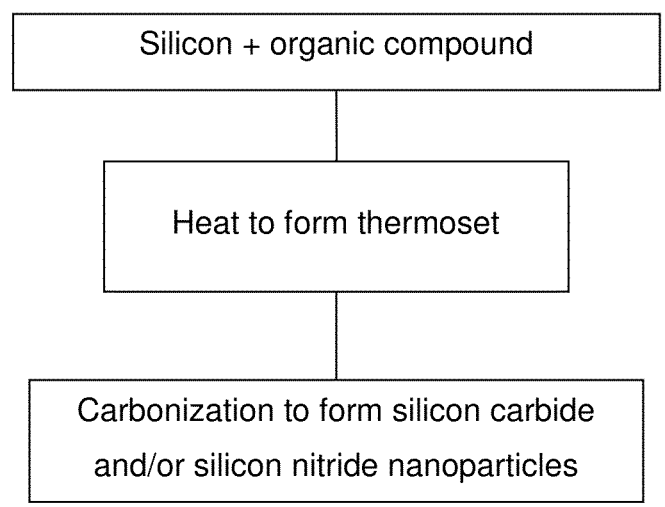
FIG. 1 schematically illustrates a process for forming the disclosed compositions.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is (1) a method for the in situ formation of nanoparticle silicon carbide (SiC) and nanoparticle silicon nitride ($Si_3N_4$) from reaction of elemental silicon particles with a meltable carbon precursor with or without a carbon matrix in one step affording a shaped composition with structural integrity, (2) various elemental silicon-carbon precursor/thermoset compositions at multiple stages, (3) various nanoparticle silicon carbide-carbon matrix compositions, (4) various nanoparticle silicon nitride-carbon matrix compositions, (5) fiber reinforced silicon-carbide and silicon carbide-carbon matrix composites, and (6) fiber reinforced silicon nitride-carbide and silicon nitride-carbon matrix composites.

Also disclosed herein are (1) a method for the in situ formation of nanoparticle SiC and nanoparticle $Si_3N_4$ from reaction of excess elemental silicon particles with a meltable carbon precursor with a silicon matrix in one step affording a shaped composition with structural integrity, (2) various elemental silicon-carbon precursor/thermoset compositions with excess silicon at multiple stages, (3) various nanoparticle silicon carbide-silicon matrix compositions, (4) various nanoparticle silicon nitride-silicon matrix compositions, (5) fiber reinforced silicon-carbide and silicon carbide-silicon matrix composites, and (6) fiber reinforced silicon nitride-carbide and silicon nitride-silicon matrix composites.

In the methods disclosed herein, elemental powder silicon is combined with a carbon precursor. When the same reaction is performed in a flow of nitrogen, silicon nitride (outer surface) and silicon carbide (interior)-carbon matrix compositions are also formed in a stoichiometric array. The carbon precursors are compounds such as polymers or resins with functional unsaturation to permit the carbon precursor to undergo conversion from the melt to form shaped thermosets or crosslinked polymers and upon conversion to carbon exhibit high char yields. A typical composition includes the carbon precursor and the elemental silicon powder. Upon heating the composition, the carbon precursor melts at its melting point and is thermally converted to a shaped solid thermoset through reaction of the unsaturated sites. To remove entrapped air pockets and thus obtain a fully dense, void-free thermoset, the shaped thermoset composition can be consolidated under pressure and/or vacuum, which will also bring the reactants (silicon and carbon atoms) during the thermal treatment above 500° C. into intimate contact for the reaction to readily occur to afford the ceramic nanoparticle solid composition. Thermal treatment of the shaped thermoset above 500° C. and to about 1450° C. results in carbonization of the carbon precursor yielding carbon atoms that react in an argon atmosphere with the silicon particles affording the silicon carbide nanoparticles, which are embedded in the excess carbon.

To obtain the high surface area silicon carbide nanoparticles, it is important that the reaction be performed at a very slow heat up rate especially at and above the melting point of the silicon to ensure a controlled exothermic reaction. The temperature can be held for an extended time at various temperatures above the melting point so that the silicon completely melts to ensure a smooth reaction of the silicon with the carbon in a controlled manner. The slow heat-up rate ensures that the carbon atoms interact with the silicon before and after the melting of the silicon. When melted, silicon reacts with the carbon very rapidly and when heated very slowly, nanosized silicon carbide particles are formed. Faster heating rates can be used up to the melting point of the silicon before the reaction readily occurs.

The temperatures at which the synthetic process occurs are well below those normally associated with the formation of silicon carbide and nitride ceramics from reaction of the silicon source with graphitic carbon. By its very nature, the method permits the carbide- or nitride-carbon composites to be easily shaped by molding procedures (injection molding, vacuum molding, pressure molding, spreading, etc.), which is a far less costly and involved process than machining a hot press sintered material.

The present methods can create carbides or nitrides as nanoparticles from reaction of elemental silicon in a controlled manner with a meltable carbon precursor with fast reaction of the "hot" carbon atoms being formed during the carbonization process and reacting with the silicon near the melting point to afford silicon carbide nanoparticles (argon atmosphere) within a relatively narrow size range and with silicon nitride nanoparticles (nitrogen atmosphere) being formed on the exterior portion of the solid ceramic exposed to nitrogen gas. Thin films of silicon nitride nanoparticles within a carbon matrix can also be formed.

An excess of carbon ensures the formation of a carbon matrix in which the silicon carbide nanoparticles are embedded, or the reaction can be conducted stoichiometrically to yield only silicon carbide nanoparticles. Heating of this composition to even higher temperatures at least to 2000° C. or greater should enhance the physical properties of the formed ceramic due to the migration of atoms of silicon and carbon from the individual nanoparticles, which is a form of fusion or bonding of the particles. The amount of silicon carbide and carbon within the resulting composition can be varied based on the quantity of each individual component (elemental silicon and melt processable carbon resin) mixed for usage in the precursor composition. When the reaction is performed in a nitrogen atmosphere, the silicon preferentially reacts with the nitrogen, especially on the exterior part of a shaped component, relative to the carbon affording the corresponding silicon nitride in pure form. Nitrogen cannot progress very far into the solid shaped sample ensuring silicon carbide formation in the interior portion of any thick solid component. If silicon is presence in excess amount relative to the carbon, all of the above applies except that the formed ceramic silicon carbide nanoparticles are embedded in glassy silicon. This may limit the usage of the solid composition below 1400° C.

Regardless of the ratio of elemental silicon to carbon source, the silicon carbides or nitrides form as nanoparticles. This is a highly desirable result, as it is generally accepted that homogeneous nanoparticle composites of ceramics will have better properties than their much more common microparticle counterparts. Moreover, new technologies that do not presently exist could become important due to the higher surface area, more reactive silicon carbide nanoparticles. The interaction of the nanoparticles with each other and the ability to pack tightly would favorably enhance the physical properties relative to microsized particles.

Carbon, ceramic, and metal fibers may be incorporated into various mixtures of precursor compositions composed of elemental silicon and the acetylenic-containing aromatic compounds or polymers (carbon source) and the resulting fiber-containing mixture is converted to a shaped solid at temperatures below 500° C., followed by heating to temperatures ≥1400° C. yielding a carbon-fiber reinforced silicon carbide nanoparticle-carbon matrix composite. The precursor composition (elemental silicon and carbon precursor) described above are mixed with continuous carbon fibers or chopped carbon fibers and heated until conversion to the shaped thermoset forms. The fibers may also be, for example, metal or ceramic. Heating of the carbon-fiber reinforced thermoset above 500° C. and ≥1400° C. in an inert atmosphere (argon) results in the formation of the carbon fiber reinforced silicon carbide-carbon matrix composites. The toughened, solid carbon fiber ceramic composite can be used for structural and electronic applications (e.g., flak jacket/bullet proof vest, automobile and aircraft brakes, high temperature/high voltage semiconductor electronics up to 600° C., and nuclear reactors). The precursor composition can contain various combinations of elemental silicon and carbon precursor that will lead to shaped ceramics with numerous amounts of silicon carbide nanoparticles embedded in a carbon or silicon matrix composite, which could be beneficial for specific applications. For application above 1400° C., the carbon should be presence in excess or in a stoichiometric amount with the silicon to ensure 100% yield of silicon carbide or silicon nitride formation or combination thereof. In all cases, precursor compositions containing non-stoichiometric amounts with silicon in excess ensure the formation of the silicon ceramic nanoparticles embedded in a silicon matrix and usage below 1400° C. due to the melting point of silicon at around 1400° C.

As noted above, when the elemental silicon and carbon precursor composition with carbon in excess are heated in a nitrogen atmosphere, silicon nitride nanoparticles form as a layer on the exterior portion of the ceramics. Therefore, another composition would be the formation of silicon nitride-carbon matrix compositions, which is a direct interaction of nitrogen with the silicon atoms of the precursor silicon forming silicon nitride nanoparticles. Thus, by changing the atmosphere for performing the reaction, one can selectively form either the silicon-carbide carbon matrix composition or the silicon-nitride carbon matrix composition or combinations thereof. When the fiber-containing precursor compositions are heated in a nitrogen atmosphere on thin films, fiber reinforced silicon nitride-carbon matrix composites will be formed. Regardless of the inert atmosphere (argon or nitrogen), the composite may have outstanding oxidative stability and temperature capabilities in excess of 3000° C. when carbon is the matrix material.

The synthetic method may produce silicon carbides (SiC) and silicon nitrides ($Si_3N_4$) in shaped solid configurations from reaction of elemental silicon with a meltable carbon precursor, exhibiting an extremely high char yield, at elevated temperatures above 600° C. Mixed phases of SiC and $Si_3N_4$ can also be produced. The SiC and $Si_3N_4$ can be produced as nanoparticles from the slow reaction of silicon at the beginning of the melting point temperature of silicon with carbon atoms in argon and nitrogen atmospheres, respectively, during the pyrolysis reaction. When (a) powdered silicon even in micro sized particles is combined with (b) carbon precursors that melt and only contain carbon and hydrogen followed by (c) heating to a temperature that converts the precursor into a solid thermoset in which the silicon is homogeneously embedded within the solid composition and the combination can be (d) thermally converted to a solid shaped ceramic solid containing high yields of pure silicon carbide nanoparticles or silicon nitride nanoparticles or combinations thereof depending on whether the reaction is performed in argon or nitrogen. The appropriate silicon nanoparticle ceramics are formed in situ from the interaction of the silicon particles with the carbon atoms of the carbon precursor or with nitrogen during the thermal treatment from 600-1600° C., 600-1900° C., or to greater than 1900 or 2000° C. At 1450° C., the cubic β-SiC is formed but by heating the SiC nanoparticles to temperatures in excess of 2000° C., the hexagonal α-SiC phase may be produced. Small amounts of α-SiC may also be produced at lower temperatures as evidenced by the small peaks or shoulders at 34° in the XRDs FIGS. 5, 7, 9, and 10. The particle size of silicon-based ceramic can be controlled as a function of the temperature heat-up rate and the upper heated temperature and whether the reaction of silicon with carbon occurs in the silicon melt while heating rapidly (large nanoparticle to microsized SiC) to higher temperatures or at the beginning silicon melt (nanoparticle size SiC) temperature and slowly heating in a controlled manner. The silicon particles do not readily react with the carbon or nitrogen until near the melting or after the melting of the silicon. The carbon sources are melt processable aromatic-containing acetylenes, e.g. 1,2,4,5-tetrakis(phenylethynyl)benzene (TPEB), or low molecular weight polymers that exhibit extremely high char yields to ensure high density, void-free solid components. The carbon precursor may contain only C and H to insure that pure silicon carbide and silicon nitride are produced controllably during the reaction. The silicon carbide and/or silicon nitride nanoparticles form around the melting point of silicon with the reaction occurring faster at higher temperatures in the melt affording larger particle sizes of the ceramic. When an excess of the carbon precursor is used, the individual formed ceramic nanoparticles (silicon carbide or silicon nitride) are glued or bound together with the resulting nanostructured or amorphous elastic carbon to afford structural integrity. The overall properties of the ceramics can be tailored as a function of the amount of the reactants (silicon powder and carbon source) used in precursor composition.

In addition as stated above, when an excess of silicon is used so that all of the carbon atoms are reacted, the silicon carbide nanoparticles are embedded in a matrix of silicon. Depending on the application, the method allows for the silicon carbide nanoparticles to be embedded in either carbon or silicon. Thus, the silicon carbide/nitride compositions can be easily tailored to have various amounts of the matrix material (carbon or silicon) to essentially a composition of pure silicon carbide or silicon nitride or combinations thereof.

Figure 2:
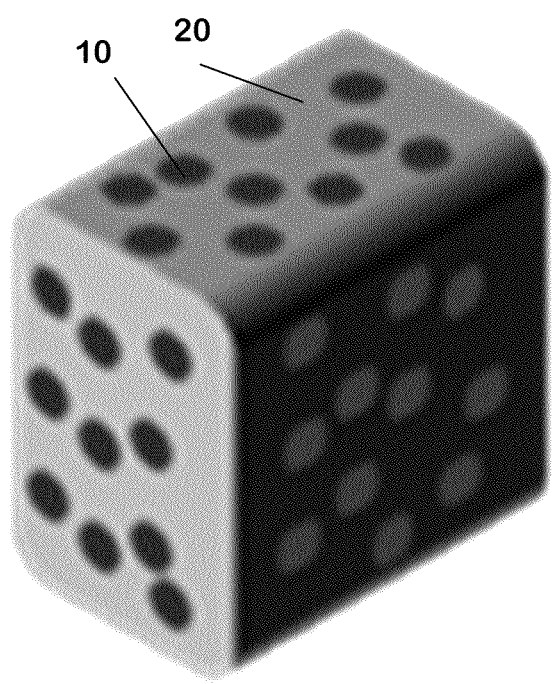
FIG. 2 schematically illustrates silicon particles 10 embedded in a thermoset matrix 20.
Figure 3:
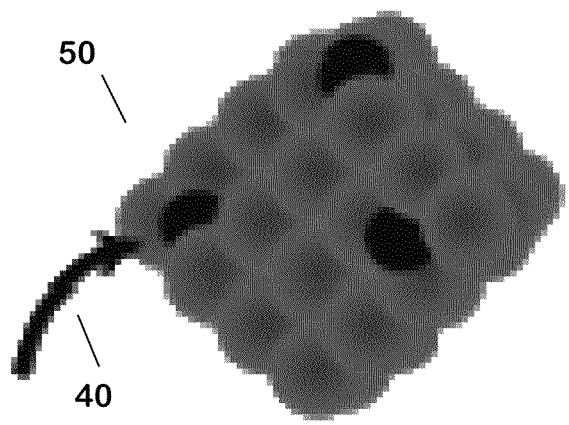
FIG. 3 schematically illustrates the transfer 40 of carbon atoms from the carbon matrix 30 to the silicon 50.
Figure 3:
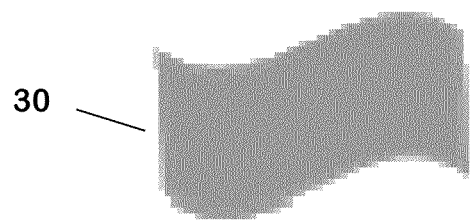
Figure 4:
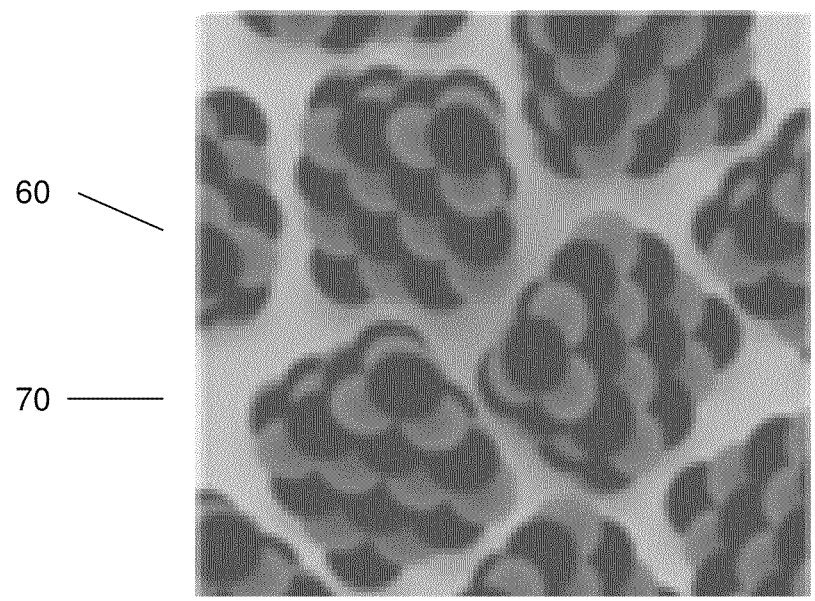
FIG. 4 schematically illustrates silicon carbide nanoparticles 60 in a carbonaceous matrix 70.
Figure 5:
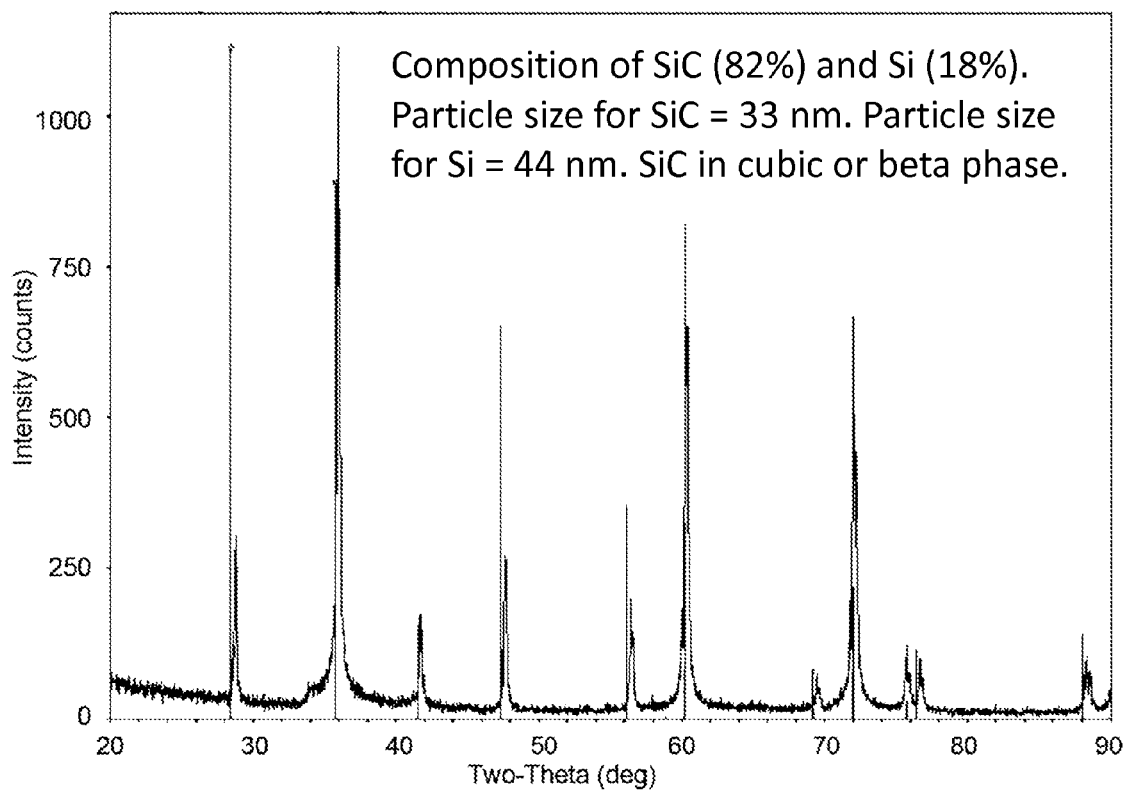
FIG. 5 shows an X-ray diffraction analysis (XRD) of a sample containing SiC nanoparticles in a silicon matrix.

The process is outlined in FIG. 1 and schematically illustrated in FIGS. 2-4. Any reactions described are not limiting of the presently claimed methods and compositions. Even though microsized silicon powder is used in the reaction, the silicon carbide and silicon nitride may be produced as nanoparticles from the reaction of the highly reactive carbon atom, being produced during pyrolysis (carbonization) of the carbon precursor, with the activated silicon surface, thereby lowering the temperature of SiC or $Si_3N_4$ formation. Moreover, by varying the amount of elemental silicon, which forms reactive silicon ceramic nanoparticles relative to the carbon precursor, the amount of SiC or $Si_3N_4$ can be readily changed with respect to the amount of carbon matrix in order to vary the properties of the resulting solid composition. The nanoparticle-containing SiC or $Si_3N_4$ carbon-matrix composites are expected to exhibit unique physical properties such as hardness, toughness, and electrical conductivity, owing to the high surface area of the nanoparticles and the presence of the relatively elastic carbon, which would exist in forms ranging from amorphous to nanotube to graphitic carbon and are thermally stable to temperatures in excess of 3000° C.

The native presence of an "elastic" carbon matrix allows for toughening of the inherently brittle sintered ceramics and the isolation of the ceramic nanoparticle within the matrix material. The pure SiC could be readily consolidated to a tough, hard refractory ceramic by pressureless sintering techniques at elevated temperatures (>2000° C.). The carbon permits operation of the toughened ceramic at extremely high temperatures, owing to carbon's high melting point (>3000° C.). Ceramic/carbon-matrix compositions are currently being sought for these reasons, and the present method may permit straightforward preparation of shaped solid composites in a single step for the first time, in contrast to the traditional means of first forming the ceramic powder and then preparing the carbon-matrix composite under sintering conditions. Also, the ratio of ceramic to carbon is easily tuned based only on the ratio of elemental silicon powder to carbon-precursor. Potential applications for these materials include structural engine components, automobile components such as brake rotors, electrical components and devices, armor, and solar panels.

Fiber or carbon fiber-reinforced silicon carbide and silicon nitride carbon matrix composites can be fabricated in one step to a shaped component and may exhibit outstanding mechanical and hardness properties for usage under extreme environmental high temperature conditions. Such SiC-based materials do not currently exist. Finely divided fiber reinforced silicon ceramic carbon composites may allow the consolidation of fully dense, shaped, low density, solid components with extreme fracture resistance for uses in high stress and temperature applications such as advanced engine components for aircraft and automobiles, where increased operation temperature and mechanical integrity could translate into tremendous economic advantages. Such tough, easily shaped ceramic composites could be significant to the next generation of army tanks and other armor vehicles, which can be designed to be more energy efficient and lighter weight than those in current service. In addition, a more robust nuclear reactor could be readily fabricated for aircraft carriers needing the superior processability of tough structural rods and housing of the heat resistant silicon carbide or silicon nitride ceramic-carbon composites. Also, lightweight, tough, and hard ceramics easily made in controllable forms could be very important for the fabrication of advanced armor, energy storage and power electronic devices, ceramic plates in bulletproof vests, high performance "ceramic" brake discs, high-temperature gas turbines, nuclear rod/structural application in which the components are fabricated in a mold in a shaped structure. Its high thermal conductivity, together with its high-temperature strength, low thermal expansion, and resistance to chemical reaction, makes silicon carbide valuable in the manufacture of high-temperature bricks and other refractories. It is also classed as a semiconductor, having an electrical conductivity between that of metals and insulating materials. This property, in combination with its thermal properties, makes SiC a promising substitute for traditional semiconductors such as silicon in high-temperature applications. A longstanding use of conductive ceramics is as heating elements for electric heaters and electrically heated furnaces. Conductive ceramics are especially effective at elevated temperatures and in oxidizing environments where oxidation-resistant metal alloys fail. The ability to fabricate tough, shaped silicon carbide or silicon nitride components in one step enhances their importance due to the economic advantages and the elimination of machining to a shaped component.

In the first step of the method, two components are combined and may be thoroughly mixed. The first component is silicon in elemental form. Suitable silicon is readily available in powder form in >99% purity. The silicon powder may be milled to reduce its particle size. Milling to as small a particle size as possible may improve the final product.

The second component is an organic compound that has a char yield of at least 60% by weight. The char yield may also be as high as at least 70%, 80%, 90%, or 95% by weight. The char yield of a potential compound may be determined by comparing the weight of a sample before and after heating to at least 1000° C. for at least 1 hr in an inert atmosphere such as nitrogen or argon. Any such compounds with high char yields may be used as the charring may play a role in the mechanism of the reactions. This char yield may be measured at an elevated pressure to be used when a heating step is also performed at such pressure. Thus, a compound having a low char yield at atmospheric pressure but having a high char yield under external pressure or the conditions that the disclosed methods are performed may be suitable for producing silicon carbides and silicon nitrides.

Certain organic compounds may exhibit any of the following characteristics, including mutually consistent combinations of characteristics: containing only carbon and hydrogen; containing aromatic and acetylene groups; containing only carbon, hydrogen, and nitrogen or oxygen; containing no oxygen; and containing a heteroatom other than oxygen. It may have a melting point of at most 400° C., 350° C., 300° C., 250° C., 200° C. or 150° C. and the melting may occur before polymerization or degradation of the compound or it may be a liquid. Examples of organic compounds include, but are not limited to, 1,2,4,5-tetrakis(phenylethynyl)benzene (TPEB), 4,4'-diethynylbiphenyl (DEBP), N,N'-(1,4-phenylenedimethylidyne)-bis(3-ethynylaniline) (PDEA), N,N'-(1,4-phenylenedimethylidyne)-bis(3,4-dicyanoaniline) (dianilphthalonitrile), and 1,3-bis(3,4-dicyanophenoxy)benzene (resorcinol phthalonitrile) or a prepolymer thereof. More than one organic compound may be used. Prepolymers may also be used, such as a prepolymer of TPEB or other suitable organic compounds. Different compounds can be blended together and/or reacted to a prepolymer stage before usage as the organic compound of the precursor composition. The presence of nitrogen atoms in the organic compound may produce metal nitrides in the ceramic without the use of a nitrogen atmosphere.

An optional component in the precursor materials is a plurality of fibers or other fillers. Examples of fibers include, but are not limited to, carbon fibers, ceramic fibers, and metal fibers. The fibers may be of any dimension that can be incorporated into the mixture and may be cut or chopped to shorter dimensions.

Another optional component is boron for formation of silicon boron carbide nanoparticles. Suitable boron is readily available in powder form. A 95-97% boron is suitable with a higher purity boron powder (99%) being preferred. The boron powder may be milled to reduce its particle size. The boron may be used in any way disclosed in U.S. Nonprovisional application Ser. Nos. 13/768,219 and 13/749,794.

Also, the precursor mixture, including any fibers, may be formed into a shaped component. The component may be shaped and/or heated under pressure, removed from the pressure, and heated to thermoset and ceramic components as described below.

The precursor mixture, which may be mixed in a melt stage, then undergoes a heating step to form a thermoset composition. This may be performed while the mixture is in a mold. This will allow the final product to have the same shape as the mold, as the organic component of the mixture will melt if not already liquid and the mixture will fill the mold during the heating, and retain its shape when the ceramic is formed. The precursor mixture is heated in an inert atmosphere at a temperature that causes polymerization of the organic compound to a thermoset. If the organic compound is volatile, the heating may be performed under pressure, either physical or gas pressure, to avoid evaporation of the organic compound. Suitable heating temperatures include, but are not limited to, 150-500° C. or 700° C.

Heating the precursor may also cause the polymerization of the organic compound to a thermoset. The silicon particles 10 would then be dispersed throughout the thermoset 20 as shown in FIG. 2. A thermoset having the silicon particles dispersed throughout may be used as a final product. The thermoset may also be machined to a desired shape, followed by heating to form a ceramic as described below.

The silicon may be homogeneously distributed or embedded in the thermoset as an intermediate shaped solid. At this stage, the composition may have a shape that it will retain upon further heating and conversion to the ceramic from reaction of the silicon with the developing carbon matrix.

The precursor mixture may be consolidated to a shaped solid component under pressure to promote intimate contact of the reactants to provide a very dense ceramic solid or to densify the final product. The precursor mixture may be compacted under exterior pressure, removed from the pressure, and then heated to a thermoset followed by conversion to the ceramic. Alternatively, the precursor mixture may be compacted under exterior pressure and the pressure maintained while heating to the thermoset and ceramic.

Optionally, the thermoset composition may be heated between 600 to 1400° C. The upper end of the range approaches the melting point of silicon. These temperatures may produce carbonization of the organic precursor to produce a silicon-carbon composition in which the silicon is embedded in the carbon waiting to react at or above the melting point of the silicon.

In a second heating step, the thermoset composition is heated to form a ceramic. The heating is performed at a temperature that causes formation of nanoparticles of silicon carbide 60 in a carbonaceous matrix or silicon matrix 70 (FIG. 4). The carbonaceous matrix may comprise graphitic carbon, carbon nanotubes, and/or amorphous carbon. If nitrogen is present, silicon nitride nanoparticles may be formed. There may be a higher concentration of nitrides on the surface than in the interior. Suitable heating temperatures include, but are not limited to 500-1900° C. If boron is present, then silicon boron carbide nanoparticles may be formed.

The presence and composition of the silicon carbide or silicon nitride nanoparticles may be verified by any known technique for detecting nanoparticles such as SEM, TEM, or XRD. The nanoparticles may have an average diameter of less than 100 nm, 50 nm, or 30 nm. They may be generally spherical in shape or may be non-spherical, such as nanorods or other nanostructures.

The ceramic may include any amount of nanoparticles and/or nanorods, including but not limited to, at least 5%, 10%, 20%, 30%, 40%, 50%, 60%, 70%, 80%, 90%, 95%, or 99% by weight of nanoparticles. The percentage of nanoparticles and/or nanorods may be in part determined by the molar ratio of silicon and carbon atoms in the precursor mixture. At a 1:1 ratio, nearly all of the silicon and carbon may be incorporated into the nanoparticles/nanorods (nanostructures), leaving a small amount or trace of carbonaceous matrix or silicon matrix. With higher amounts of organic compound, the fraction of silicon carbide nanostructures is lower and the fraction of matrix is higher. By this method, variations in the ratio of silicon to organic may be used, affording a mixture of silicon carbide and matrix when performed in an inert atmosphere such as argon and silicon carbide, silicon nitride, and matrix when performed in a nitrogen atmosphere. When silicon nitride is made, raising the amount of carbon in the precursor mixture may lower the amount of silicon nitride in the ceramic.

The ceramic is not formed as a powder and may be in the form of a solid, unbroken mass. It may contain less than 20% by volume of voids or as low as 10%, 5%, or 1%. It may have the same shape as the precursor mixture (if solid) or it may take on the shape of a mold it was placed in during the heating. The ceramic may retain its shape in that it does not crumble when handled and may not change shape or break without the use of extreme force. The ceramic composition may be tough, hard, and have structural integrity. The degree of such properties may depend on the amount of ceramic to carbon in the solid ceramic composition. Any shape may be formed to make an article useful for incorporation into an apparatus. The article may be large enough to have a minimum size of at least 1 cm in all dimensions. That is, the entire surface of the article is at least 5 mm from the center of mass of the article. Larger articles may be made, such as having a minimum size of at least 10 cm in all dimensions. Also, the composition may have smaller sizes, such as 1 mm, 2 mm, or 5 mm.

The following examples are given to illustrate specific applications. These specific examples are not intended to limit the scope of the disclosure in this application. Any other appropriate methods and materials disclosed in U.S. Provisional Application Nos. 61/590,852; 61/640,744; 61/669,201; and 61/693,930 and U.S. Nonprovisional application Ser. Nos. 13/779,771; 13/768,219; and 13/749,794 may be used. Any carbon source, boron source, metal compound, and/or other parameter disclosed therein may be used in any combination in the presently disclosed method, and may be combined with any material and/or parameter disclosed in the present application.

EXAMPLE 1

Formulation of Precursor Composition of TPEB and Silicon Powder (1 to 5 μm Particle Size) in Molar Ratio of 1 to 50

TPEB (0.250 g; 0.523 mmol) and silicon powder (1 to 5 μm particle size) (0.732 g, 26.1 mmol) were thoroughly mixed and used as the precursor composition for the formation of refractory nanoparticle SiC embedded or bonded with the excess of silicon that behaves as a matrix material. The ratio of the two reactants can be readily varied by the described formulation method.

EXAMPLE 2

Conversion of Precursor Composition of TPEB and Silicon Powder (1 to 5 μm Particle Size) in Molar Ratio of 1 to 50 to Polymeric Thermoset Solid in an Argon Atmosphere A sample (75.2450 mg) of the precursor composition of Example 1 was weighed into a TGA ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 3

Conversion of Polymeric Thermoset Solid to Shaped Silicon Carbide-Silicon Matrix Solid Ceramic Composition by Heating to 1450° C. Under an Argon Atmosphere The solid polymeric thermoset of Example 2 was heated under a flow (110 cc/min) of argon at 3° C./min to 1200° C. and held at this temperature for 1 min followed by heating at 1° C./min to 1415° C. and holding at this temperature for 1 hr and at 1° C./min to 1450° C. and holding at this temperature for 1 hr. The resulting solid ceramic sample retained 90.45% of the original weight. XRD analysis showed the formation of pure silicon carbide nanoparticles/nanostructures embedded in a matrix of crystalline Si nanostructure.

EXAMPLE 4

Conversion of Precursor Composition of TPEB and Silicon Powder (1 to 5 μm Particle Size) in Molar Ratio of 1 to 50 to Polymeric Thermoset Solid in an Nitrogen Atmosphere A sample (71.1040 mg) of the precursor composition of Example 1 was weighed into a TGA ceramic pan, packed thoroughly, flushed with flow (110 cc/min) of nitrogen for 20 minutes, and then heated at 5° C./min to 250° C. and held at this temperature for 1 hr to consolidate to a shaped thermoset solid from reaction of the ethynyl units of TPEB.

EXAMPLE 5

Conversion of Polymeric Thermoset Solid to Shaped Silicon Carbide/Silicon Nitride Solid Ceramic Composition by Heating to 1450° C. Under a Nitrogen Atmosphere The solid polymeric thermoset of Example 4 was heated under a flow (110 cc/min) of nitrogen at 3° C./min to 1200° C. and held at this temperature for 1 min followed by heating at 1° C./min to 1415° C. and holding at this temperature for 1 hr and heating at 1° C./min to 1450° C. and holding for 1.5 hr. XRD analysis showed the formation of pure silicon carbide and silicon nitride nanoparticles/nanostructures, which are embedded in an excess amount of silicon. The silicon nitride nanoparticles/nanostructures were formed mainly on the exterior part or outer surface of the sample, which was exposed to the nitrogen. The silicon carbide nanoparticles/nanostructures were mainly formed on the interior portion of the sample.

EXAMPLE 6

Conversion of Precursor Composition of TPEB and Silicon Powder (1 to 5 µm Particle Size) in Molar Ratio of 1 to 50 to Polymeric Thermoset Solid in an Argon Atmosphere Another sample (70.7440 mg) of the precursor composition of Example 1 was weighed into a TGA ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 7

Conversion of Polymeric Thermoset Solid to Shaped Silicon Carbide-Silicon Matrix Solid Ceramic Composition by Heating to 1450° C. Under an Argon Atmosphere The solid polymeric thermoset of Example 6 was heated under a flow (110 cc/min) of argon at 2° C./min to 1300° C. and held at this temperature for 1 min followed by heating at 1° C./min to 1450° C. and holding at this temperature for 3 hr. The resulting solid ceramic sample retained 93.23% of the original weight of precursor composition of Example 6. XRD analysis showed the formation of pure silicon carbide nanoparticles/nanostructures (50%) of average particle size of 18.6 nm embedded in a matrix of crystalline Si (50%) of average particle size of 26.3 nm.

EXAMPLE 8

Formulation of Precursor Composition of TPEB and Silicon Powder (1 to 5 µm Particle size) in molar ratio of 1 to 40

TPEB (0.500 g; 1.05 mmol) and silicon (1 to 5 µm particle size) (1.12 g, 40.0 mmol) were thoroughly mixed and used as the precursor composition for the formation of refractory SiC embedded or bonded within the solid ceramic composition. The ratio of the two reactants can be readily varied by the described formulation method.

EXAMPLE 9

Conversion of Precursor Composition of TPEB and Silicon Powder (1 to 5 µm Particle Size) in Molar Ratio of 1 to 40 to Polymeric Thermoset Solid in an Argon Atmosphere A sample (75.3080 mg) of the precursor composition of Example 8 was weighed into a TGA-DSC ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 10

Conversion of Polymeric Thermoset Solid to Shaped Silicon Carbide-Silicon Matrix Solid Ceramic Composition by Heating to 1450° C. Under an Argon Atmosphere The solid polymeric thermoset of Example 9 was heated under a flow (110 cc/min) of argon at 5° C./min to 1450° C. and held at this temperature for 2 hr. At 823° C. and based on the original amount of precursor composition in Example 9, the sample retained 93.40% by weight; the weight loss being due to carbonization of the thermoset of Example 9. At about 1410° C., the silicon has completely melted (endotherm) followed by a rapid exotherm attributed to the reaction of the silicon melt with the carbonizing solid. The melted Si was embedded in the carbonaceous solid where intimate contact was present. The reaction media was heated at 1450° C. for a total of 2 hr. Upon cooling, the SiC ceramic composition was found to be extremely hard. XRD analysis (FIG. 5) showed the formation of SiC (82%) nanoparticles/nanostructures of average size of 33 nm embedded in a silicon matrix (18%) of average particle size of 44 nm. The experiment was designed to have an excess of silicon to bind the SiC nanoparticles/nanostructures.

EXAMPLE 11

Conversion of Precursor Composition of TPEB and Silicon Powder (1 to 5 µm Particle Size) in Molar Ratio of 1 to 40 to Polymeric Thermoset Solid in a Nitrogen Atmosphere A sample (66.7550 mg) of the precursor composition of Example 8 was weighed into a TGA-DSC ceramic pan, packed thoroughly, flushed with flow (110 cc/min) of nitrogen for 20 minutes, and then heated at 5° C./min to 250° C. and held at this temperature for 1 hr to consolidate to a shaped thermoset solid from reaction of the ethynyl units of TPEB.

EXAMPLE 12

Figure 6:
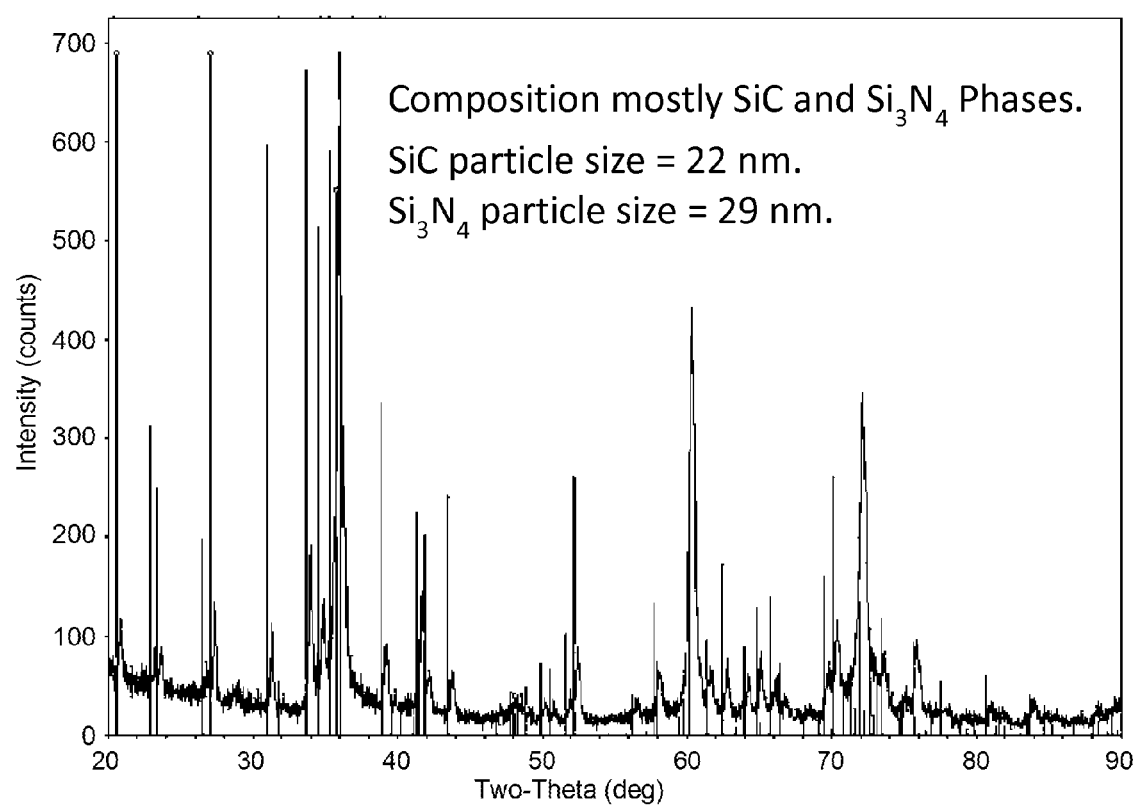
FIG. 6 shows an XRD of a sample containing SiC and $Si_3N_4$ nanoparticles in a silicon matrix.
Figure 7:
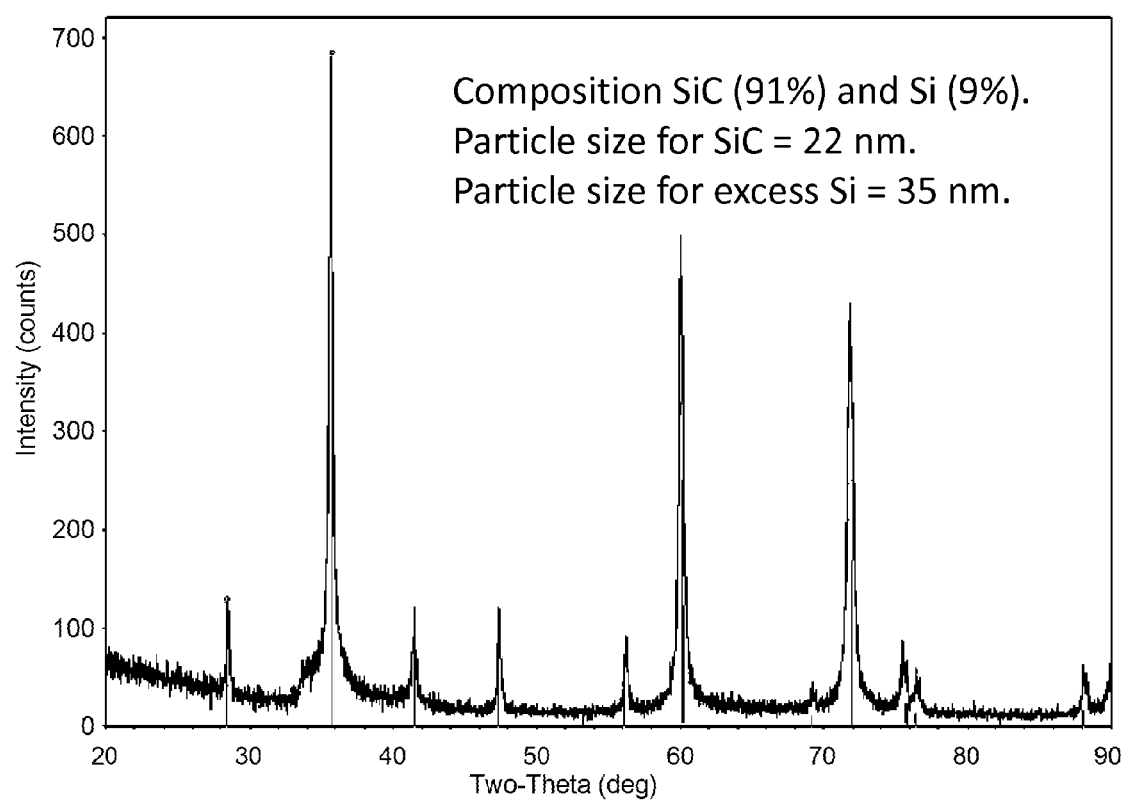
FIG. 7 shows an XRD of a sample containing SiC nanoparticles in a silicon matrix.

Conversion of Polymeric Thermoset Solid to Shaped Silicon Carbide-Silicon Nitride Silicon Matrix Solid Ceramic Composition by Heating to 1450° C. Under a Nitrogen Atmosphere The solid polymeric thermoset of Example 11 was heated under a flow (110 cc/min) of nitrogen at 5° C./min to 1450° C. and held at this temperature for 1 hr. At 1047° C. and based on the original amount of precursor composition in Example 11, the sample retained 93.09% by weight but commenced to slowly increase in weight due to reaction of the nitrogen with the Si. At about 1418° C., the silicon was completely melted (endotherm) followed by a rapid exotherm attributed to the fast reaction of the silicon melt with the gaseous nitrogen and carbon. At 1450° C., the weight of the sample was 108.2%. After 1 hr at 1450° C., the sample had taken on about 15% weight attributed to the formation of silicon nitride ($Si_3N_4$). Upon cooling, the SiC—$Si_3N_4$ ceramic composition was found to be extremely hard. XRD analysis (FIG. 6) showed the large formation of SiC nanoparticles/nanostructures of particle size of 22 nm and $Si_3N_4$ nanoparticles/nanostructures of particle size of 29 nm.

EXAMPLE 13

Conversion of Precursor Composition of TPEB and Silicon Powder (1 to 5 μm Particle Size) in Molar Ratio of 1 to 40 to Polymeric Thermoset Solid in an Argon Atmosphere A sample (26.4840 mg) of the precursor composition of Example 8 was weighed into a TGA-DSC ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 14

Conversion of Polymeric Thermoset Solid to Shaped Silicon Carbide-Silicon Matrix Solid Ceramic Composition by Heating to 1450° C. Under an Argon Atmosphere The solid polymeric thermoset of Example 13 was heated under a flow (110 cc/min) of argon at 3° C./min to 1300° C. and held at this temperature for 3 hr and retained 91.17% of weight based on the original precursor weight of Example 13. XRD analysis showed only a small amount of SiC formation and mostly crystalline Si remaining; the reaction of solid Si with carbon did not occur very readily in the solid phase indicating the importance of the reaction occurring in the Si melt.

EXAMPLE 15

Formulation of Precursor Composition of TPEB and Silicon Powder (1 to 5 μm Particle Size) in Molar Ratio of 1 to 30

TPEB (0.647 g; 1.35 mmol) and silicon (1 to 5 μm particle size) (1.12 g, 40.0 mmol) were thoroughly mixed and used as the precursor composition for the formation of refractory nanoparticle SiC in a solid ceramic composition. The ratio of the two reactants can be readily varied by the described formulation method.

EXAMPLE 16

Conversion of Precursor Composition of TPEB and Silicon Powder (1 to 5 μm Particle Size) in Molar Ratio of 1 to 30 to Polymeric Thermoset Solid in an Argon Atmosphere A sample (65.2300 mg) of the precursor composition of Example 15 was weighed into a TGA-DSC ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 17

Figure 8:
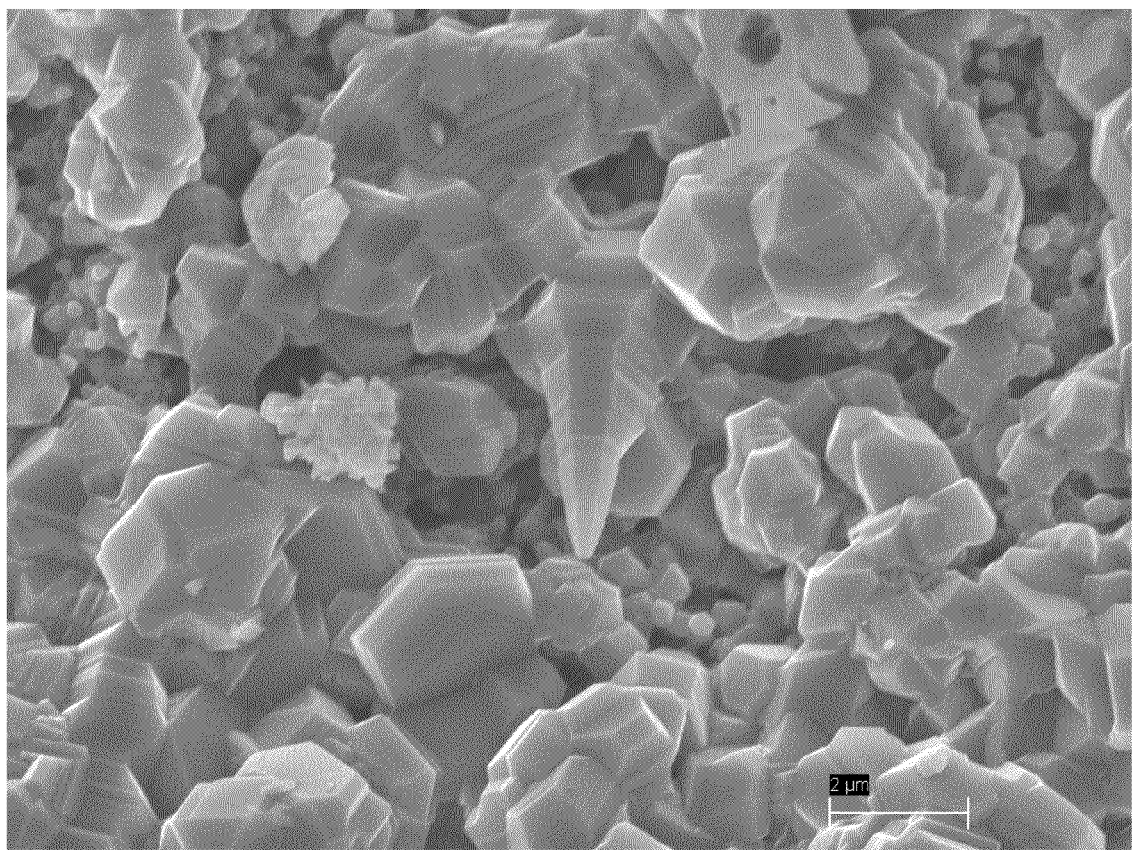
FIG. 8 shows a scanning electron micrograph (SEM) of a sample containing SiC nanoparticles.
Figure 9:
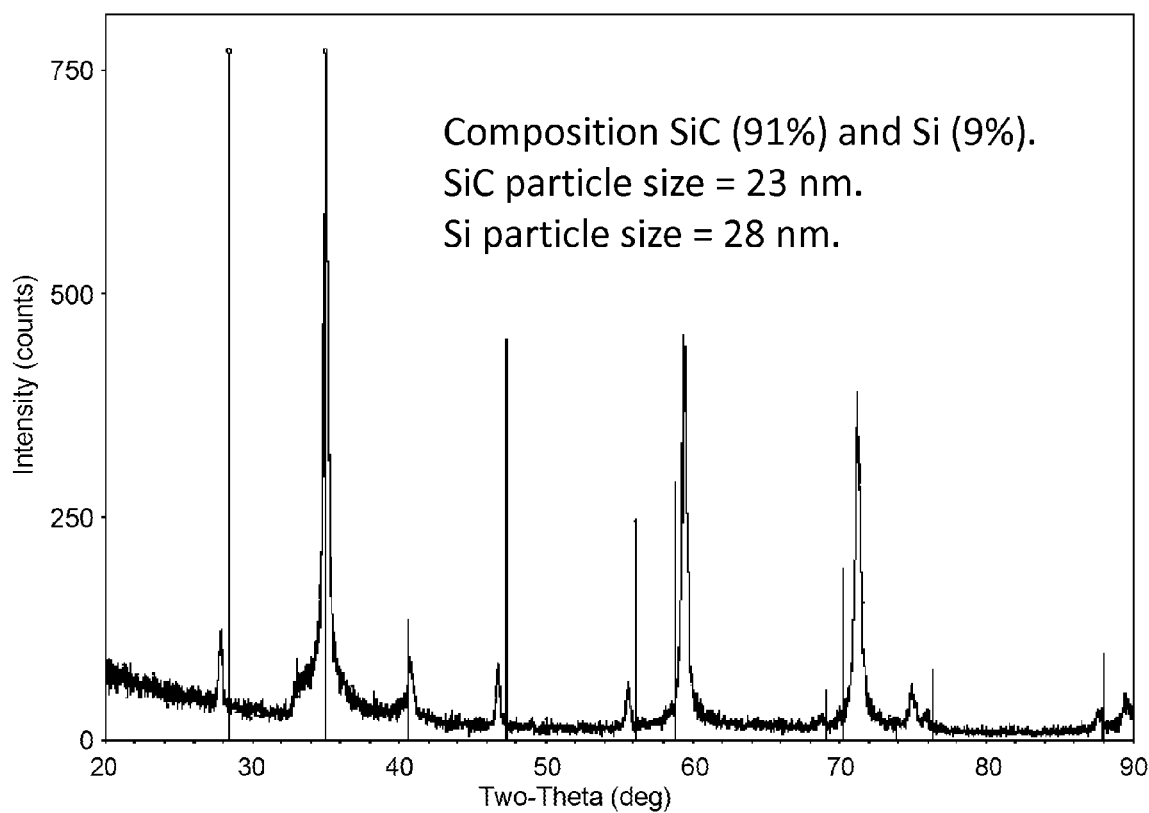
FIG. 9 shows an XRD of a sample containing SiC nanoparticles in a silicon matrix.
Figure 10:
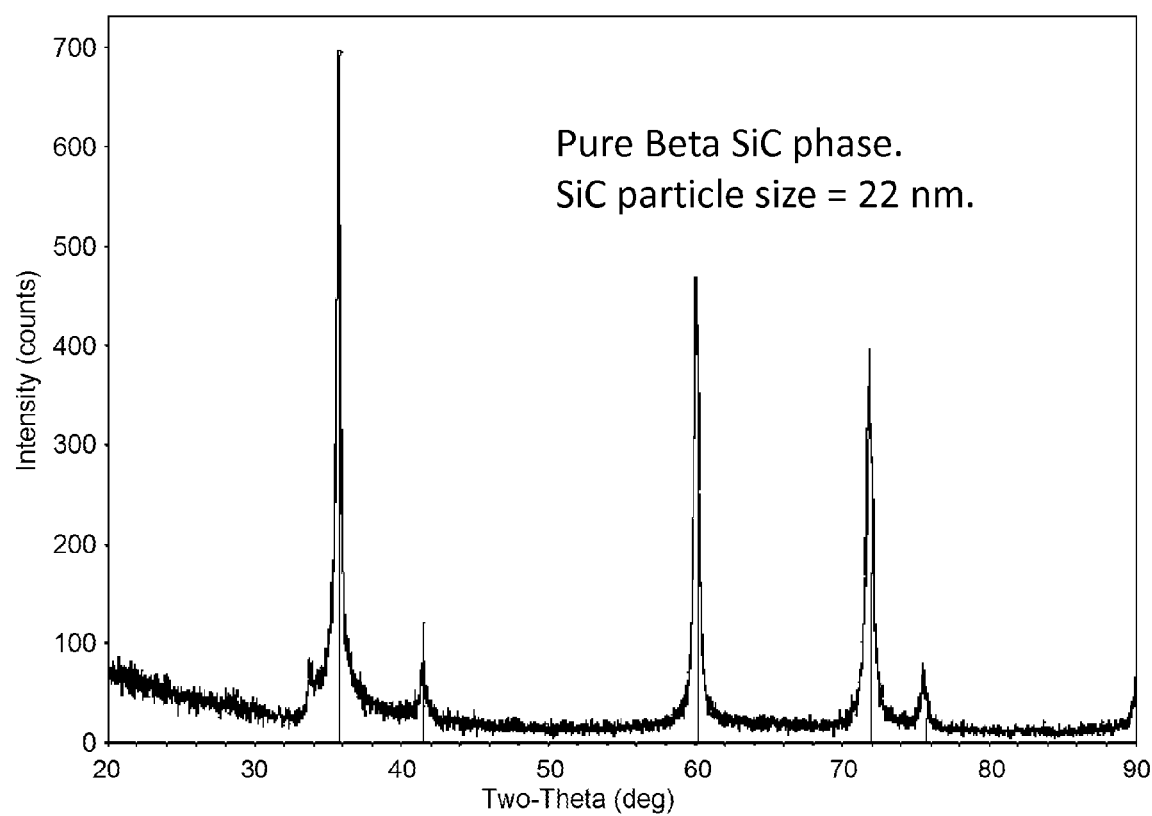
FIG. 10 shows an XRD of a sample containing SiC nanoparticles in a carbon matrix.

Conversion of Polymeric Thermoset Solid to Shaped Silicon Carbide-Silicon Matrix Solid Ceramic Composition by Heating to 1450° C. Under an Argon Atmosphere The solid polymeric thermoset of Example 16 was heated under a flow (110 cc/min) of argon at 5° C./min to 1350° C. and held at this temperature for 1 minute followed by heating at 1° C./min to 1405° C. and holding at this temperature for 90 minutes, at 1° C./min to 1415° C. and holding at this temperature for 30 minutes, and finally at 1° C./min 1430° C. and holding at this temperature for 30 minutes. Based on the original precursor composition of Example 16, the ceramic solid retained 89.88% by weight. Upon cooling, the SiC containing solid was found to be extremely hard. XRD analysis (FIG. 7) showed the formation of SiC nanoparticles/nanostructures (91%) with an average particle size of 22 nm embedded in excess silicon matrix (9%) with an average particle size of 35 nm. FIG. 8 shows an SEM of a typical sample.

EXAMPLE 18

Conversion of Precursor Composition of TPEB and Silicon Powder (1 to 5 μm Particle Size) in Molar Ratio of 1 to 30 to Polymeric Thermoset Solid in an Argon Atmosphere Another sample (68.8260 mg) of the precursor composition of Example 15 was weighed into a TGA-DSC ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 19

Conversion of Polymeric Thermoset Solid to Shaped Silicon Carbide-Silicon Matrix Solid Ceramic Composition by Change of Heat Treatment to 1450° C. Under an Argon Atmosphere The solid polymeric thermoset of Example 18 was heated under a flow (110 cc/min) of argon at 2° C./min to 1150° C. and held at this temperature for 1 minute followed by heating at 1° C./min to 1405° C. and holding at this temperature for 1 hr, at 1° C./min to 1415° C. and holding at this temperature for 1 hr, and finally heating at 1° C./min to 1430° C. and holding at this temperature for 1 hr. Based on the original precursor composition of Example 18, the ceramic solid retained 90.14% by weight. Upon cooling, the SiC containing solid ceramic was found to be extremely hard. XRD analysis (FIG. 9) showed the formation of SiC nanoparticles/nanostructures (91%) with an average particle size of 23 nm embedded in excess, unreacted silicon matrix (9%) with an average particle size of 28 nm. The experiment was designed to have an excess of silicon to bind the SiC nanoparticles/nanostructures and for the reaction to occur under more controlled conditions.

EXAMPLE 20

Conversion of Precursor Composition of TPEB and Silicon Powder (1 to 5 μm Particle Size) in Molar Ratio of 1 to 30 to Polymeric Thermoset Solid in an Argon Atmosphere Another sample (78.4630 mg) of the precursor composition of Example 15 was weighed into a TGA-DSC ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 21

Conversion of Polymeric Thermoset Solid to Shaped Silicon Carbide-Silicon Matrix Solid Ceramic Composition by Change of Heat Treatment to 1450° C. Under an Argon Atmosphere The solid polymeric thermoset of Example 20 was heated under a flow (110 cc/min) of argon at 2° C./min to 1300° C. and held at this temperature for 1 minute followed by heating at 1° C./min to 1450° C. and holding at this temperature for 3 hr. Based on the original precursor composition of Example 20, the ceramic solid retained 89.54% by weight. Upon cooling, the gray SiC containing ceramic solid was found to be extremely hard. XRD analysis showed the formation of SiC nanoparticles/nanostructures (95%) with an average particle size of 25 nm embedded in excess, unreacted silicon matrix (5%) with an average particle size of 12.1 nm.

EXAMPLE 22

Formulation of Precursor Composition of TPEB and Silicon Powder in Molar Ratio of 1 to 21

TPEB (0.910 g; 1.90 mmol) and silicon (1 to 5 µm particle size) (1.12 g, 40.0 mmol) were thoroughly mixed and used as the precursor composition for the formation of refractory nanoparticle SiC embedded or bonded with the excess of carbon that behaves as a matrix material. The ratio of the two reactants can be readily varied by the described formulation method.

EXAMPLE 23

Conversion of Precursor Composition of TPEB and Silicon Powder (1 to 5 µm Particle Size) in Molar Ratio of 1 to 21 to Polymeric Thermoset Solid in an Argon Atmosphere A sample (67.0020 mg) of the precursor composition of Example 22 was weighed into a TGA-DSC ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 24

Conversion of Polymeric Thermoset Solid to Shaped Silicon Carbide-Carbon Matrix Solid Ceramic Composition by Heating to 1450° C. Under an Argon Atmosphere The solid polymeric thermoset of Example 23 was heated under a flow (110 cc/min) of argon at 2° C./min to 1150° C. and held at this temperature for 1 minute followed by heating at 1° C./min to 1405° C. and holding at this temperature for 1 hr, heating at 1° C./min to 1415° C. and holding at this temperature for 1 hr, and finally heating at 1° C./min 1430° C. and holding at this temperature for 1 hr. Based on the original precursor composition of Example 23, the ceramic solid retained 87.24% by weight. Upon cooling, the SiC containing ceramic solid was found to be extremely hard. XRD analysis (FIG. 10) showed the formation of SiC nanoparticles/nanostructures (100%) with an average particle size of 22 nm embedded in small amount of amorphous carbon. The experiment was designed to have an excess of carbon to bind the SiC nanoparticles.

EXAMPLE 25

Formulation of Precursor Composition of TPEB and Silicon Powder in Molar Ratio of 1 to 10

TPEB (0.250 g; 0.523 mmol) and silicon (1 to 5 µm particle size) (0.146 g, 5.21 mmol) were thoroughly mixed and used as the precursor composition for the formation of refractory nanoparticle SiC embedded or bonded with the excess of carbon that behaves as a matrix material. The ratio of the two reactants can be readily varied by the described formulation method.

EXAMPLE 26

Conversion of Precursor Composition of TPEB and Silicon Powder (1 to 5 µm Particle Size) in Molar Ratio of 1 to 10 to Polymeric Thermoset Solid in an Argon Atmosphere A sample (57.3190 mg) of the precursor composition of Example 25 was weighed into a TGA-DSC ceramic pan, packed thoroughly, flushed with flow (110 cc/min) of argon for 20 minutes, and then heated at 5° C./min to 250° C. and held at this temperature for 1 hr to consolidate to a shaped thermoset solid from reaction of the ethynyl units of TPEB.

EXAMPLE 27

Conversion of Polymeric Thermoset Solid to Shaped Silicon Carbide-Carbon Matrix Solid Ceramic Composition by Heating to 1450° C. Under an Argon Atmosphere The solid polymeric thermoset of Example 26 was heated under a flow (110 cc/min) of argon at 3° C./min to 1200° C. and held at this temperature for 1 minute and then heated at 1° C./min to 1450° C. and held at this temperature for 3 hr. Upon cooling, the SiC-carbon matrix composition was found to be tough and gray in color. The experiment was designed to have an excess of carbon to bind the SiC nanoparticles/nano structures.

EXAMPLE 28

Conversion of Precursor Composition of TPEB and Silicon Powder (1 to 5 µm Particle Size) in Molar Ratio of 1 to 10 to Polymeric Thermoset Solid in an Nitrogen Atmosphere A sample (56.0440 mg) of the precursor composition of Example 25 was weighed into a TGA-DSC ceramic pan, packed thoroughly, flushed with flow (110 cc/min) of nitrogen for 20 minutes, and then heated at 5° C./min to 250° C. and held at this temperature for 1 hr to consolidate to a shaped thermoset solid from reaction of the ethynyl units of TPEB.

EXAMPLE 29

Conversion of Polymeric Thermoset Solid to Shaped Silicon Carbide-Silicon Nitride Carbon Matrix Solid Ceramic Composition by Heating to 1450° C. Under a Nitrogen Atmosphere The solid polymeric thermoset of Example 28 was heated under a flow (110 cc/min) of nitrogen at 3° C./min to 1200° C.

and held at this temperature for 1 minute and at 1° C./min to 1450° C. and held at this temperature for 3 hr. The sample contained an excess of carbon in which the SiC and $Si_3N_4$ nanoparticles/nanostructures were embedded. Upon cooling, the SiC—$Si_3N_4$ carbon ceramic solid composition was found to be hard and tough.

EXAMPLE 30

Formation of Silicon Powder and TPEB Carbon Fiber Polymeric Composite in an Argon Atmosphere Into a 1.0" diameter mold fabricated from aluminum foil was placed a precursor composition (2.6527 g of powdered silicon and TPEB mixture) prepared as in Example 25 and a small amount of chopped carbon fibers was added and mixed. The composition was packed and heated to 240° C. to melt the TPEB and the melted composition was pressed with a flat surface to consolidate the sample to a flat surface. The resulting carbon fiber-precursor composition was heated under a flow of argon at 260-270° C. for 1 hr resulting in solidification to a solid carbon fiber-containing polymeric thermoset. The solid carbon fiber polymeric composite with a homogeneous distribution of the silicon powder was removed from the mold.

EXAMPLE 31

Conversion of the Silicon Powder-Carbon Fiber Polymeric Composite to Solid Silicon Carbide Carbon-Carbon Fiber Ceramic Composite in an Argon Atmosphere The shaped solid carbon fiber polymeric composite prepared in Example 30 was placed in an oven and heated under a flow of argon at 3° C./min to 1450° C. and held at this temperature for 3 hr. The resulting ceramic (SiC)-carbon-carbon fiber reinforced solid ceramic composite was cooled and appeared hard and tough.

EXAMPLE 32

Formation of Silicon Powder and TPEB Carbon Fiber Polymeric Composite in an Argon Atmosphere Into a 1.0" diameter mold fabricated from aluminum foil was placed a precursor composition (2.8534 g of powdered silicon and TPEB mixture) prepared as in Example 15 and a small amount of chopped carbon fibers was added and mixed. The composition was packed and heated under a flow of argon to 250° C. to melt the TPEB and the melted composition was pressed with a flat surface to consolidate the sample to a flat surface. The resulting carbon fiber-precursor composition was heated under a flow of argon at 260-270° C. for 1 hr resulting in solidification to a solid carbon fiber-containing polymeric thermoset. The solid carbon fiber polymeric composite with a homogeneous distribution of the silicon powder was removed from the mold.

EXAMPLE 33

Conversion of the Silicon Powder Carbon Fiber Polymeric Composite to Solid Shaped Silicon Carbide Carbon Fiber Ceramic Composite in an Argon Atmosphere The solid shaped carbon fiber polymeric composite prepared in Example 32 was placed in an oven and heated under a flow of argon at 3° C./min to 1450° C. and held at this temperature for 3 hr. The resulting ceramic (SiC)-silicon matrix-carbon fiber reinforced solid ceramic composite appeared hard and tough.

EXAMPLE 34

Formulation of Prepolymer Composition of TPEB

TPEB (10.30 g; 21.5 mmol) was placed in an aluminum planchet and heated at 260° C. for 40 minutes or until the mixture was viscous to stir with a metal spatula. The mixture was cooled, broken into small pieces, and ball milled for 2 minutes resulting in a fine black powder.

EXAMPLE 35

Formulation of Precursor Composition of Silicon, Boron, and TPEB Prepolymer and Formation of Shaped Pellet TPEB prepolymer form Example 34 (0.200 g; 0.418 mmol), boron (0.088 g, 8.14 mmol), and silicon (0.240 g; 8.54 mmol) were ball milled for 5 minutes resulting in a deep red-black fine powder. The powder was placed in a 13 mm pellet press and pressed to 12,000 pounds for 1 minute.

EXAMPLE 36

Conversion of Precursor Composition of Silicon, Boron, and TPEB Prepolymer to Solid Shaped Thermoset The pellet from Example 35 was placed in a furnace, heated at 20° C./min under an argon atmosphere to 200° C., and held at this temperature for 10 hr (overnight) resulting in the formation of a tough shaped polymeric thermoset solid. The silicon and boron were homogeneously dispersed in the solid thermoset.

EXAMPLE 37

Conversion of Precursor Composition of Silicon, Boron, and TPEB Prepolymer to Solid Shaped Thermoset Another pellet prepared as in Example 35 was placed in a furnace, heated at 20° C./min under an argon atmosphere to 250° C., and held at this temperature for 2 hr resulting in the formation of a tough shaped polymeric thermoset solid.

EXAMPLE 38

Figure 11:
FIG. 11 shows a photograph of a sample containing SiC and SiBC nanoparticles.
Figure 12:
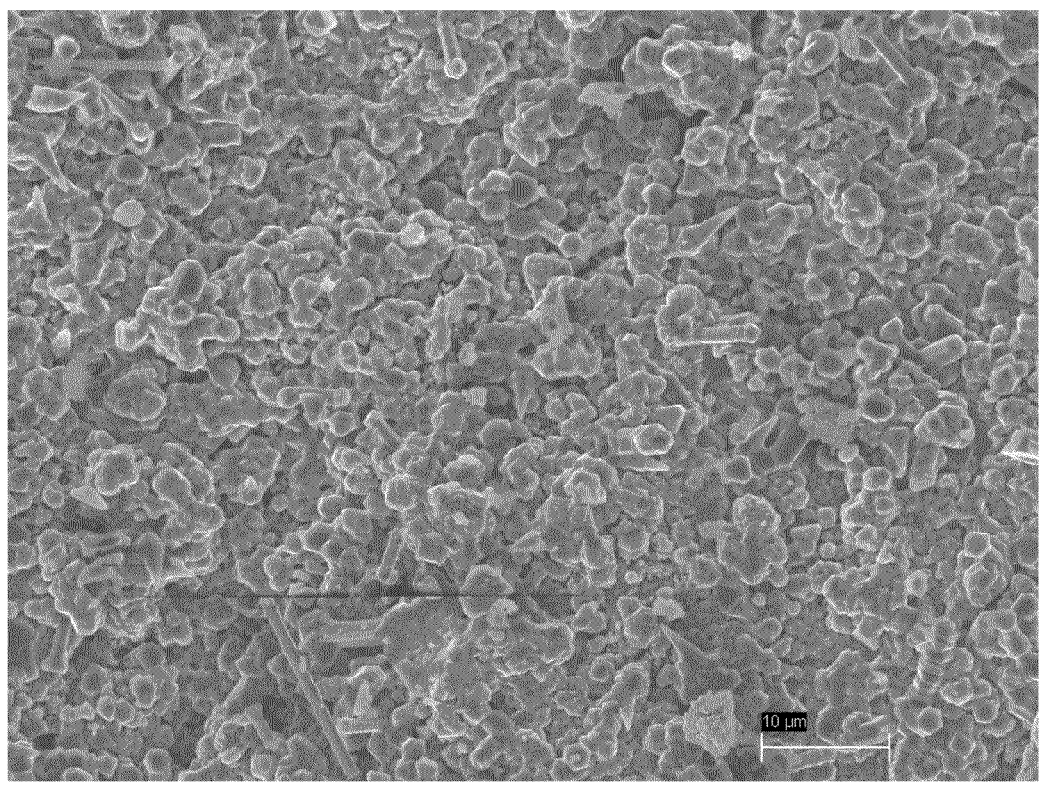
FIG. 12 shows an SEM of a sample containing SiC and SiBC nanoparticles.

Formation of Refractory SiC Solid Ceramic in One Step by Heating at 2° C./Min to 1600° C. Under an Argon Atmosphere The shaped polymeric thermoset solid (0.522 g) from Example 36 was placed in a 3" tube furnace, heated at 2° C./min under a flow (100 cc/min) of argon to 1600° C., and held at 1600° C. for 2 hr yielding a solid dense ceramic (FIG. 11) with weight retention of 92.8%. The solid ceramic was removed from the furnace, characterized by XRD, and found to form nanoparticle sized SiC in an excess of carbon as the matrix and some silicon boron carbide phase. The SiC carbon solid composition was formed in one step and exhibited great structural integrity, hardness, and toughness. SEM images (FIG. 12) show the formation of SiC nanoparticles and nanorods being formed in the ceramic solid.

EXAMPLE 39

Formulation of Precursor Composition of Silicon, Boron, and TPEB Prepolymer, Formation of Shaped Pellet, and Direct Conversion to Refractory SiBC Solid Ceramic Carbon Composition in One Step TPEB prepolymer (0.200 g; 0.418 mmol), prepared as in Example 34, boron (0.088 g, 8.14 mmol), and silicon (0.240 g; 8.54 mmol) were ball milled for 5 minutes resulting in a deep red-black fine powder. The powder was placed in a 13 mm pellet press and pressed to 10,000 pounds for 1 minute. The pellet was then placed in a furnace, heated at 20° C./min under an argon atmosphere to 250° C., and held at this temperature for 30 minutes followed by heating at 2° C./min under a flow (100 cc/min) of argon to 1500° C. and holding at 1500° C. for 2 hr yielding a solid dense ceramic with weight retention of 92.4%. Upon cooling, the solid ceramic was removed from the furnace, characterized by XRD, and found to form nanoparticle sized SiC in an excess of carbon as the matrix with a silicon boron carbon phase. The SiC carbon solid composition was formed in one step and exhibited great structural integrity, hardness, and toughness.

EXAMPLE 40

Formulation of Precursor Composition of Silicon and TPEB Prepolymer and Pellet Formation TPEB prepolymer from Example 34 (0.200 g; 0.418 mmol) and silicon powder (0.246 g; 8.75 mmol) were ball milled for 5 minutes resulting in a deep red-black fine powder. The powder was placed in a 13 mm pellet press and pressed to 10,000 pounds for 10 sec.

EXAMPLE 41

Conversion of Precursor Composition of Silicon and TPEB Prepolymer to Solid Shaped Thermoset The pellet from Example 40 was placed in a furnace, heated at 20° C./min under an argon atmosphere to 215° C., and held at this temperature for 10 hr (overnight) resulting in the formation of a tough shaped polymeric solid. The silicon powder was homogeneously dispersed in the solid thermoset.

EXAMPLE 42

Formation of Refractory SiC Solid Ceramic in One Step by Heating at 2° C./Min to 1500° C. Under an Argon Atmosphere The cured thermoset pellet (0.435 g) from Example 41 was placed in a 3" tube furnace, heated at 2° C./min under a flow (100 cc/min) of argon to 1500° C., and held at 1500° C. for 2 hr yielding a solid dense ceramic with weight retention of 85.0%. Upon cooling, the solid ceramic was removed from the furnace, characterized by XRD, and found to form nanoparticle sized pure SiC in an excess of carbon as the matrix. All of the silicon had reacted. The SiC carbon solid composition was formed in one step and exhibited structural integrity, hardness, and toughness.

EXAMPLE 43

Formulation of Precursor Composition of Silicon and TPEB Prepolymer and Pellet Formation TPEB prepolymer from Example 34 (0.200 g; 0.418 mmol) and silicon powder (0.239 g; 8.53 mmol) were ball milled for 5 minutes resulting in a deep red-black fine powder. The powder was placed in a 6 mm pellet press and pressed to 4,000 pounds for 10 sec.

EXAMPLE 44

Figure 13:
FIG. 13 shows a photograph of a sample containing nearly pure SiC nanoparticles.
Figure 14:
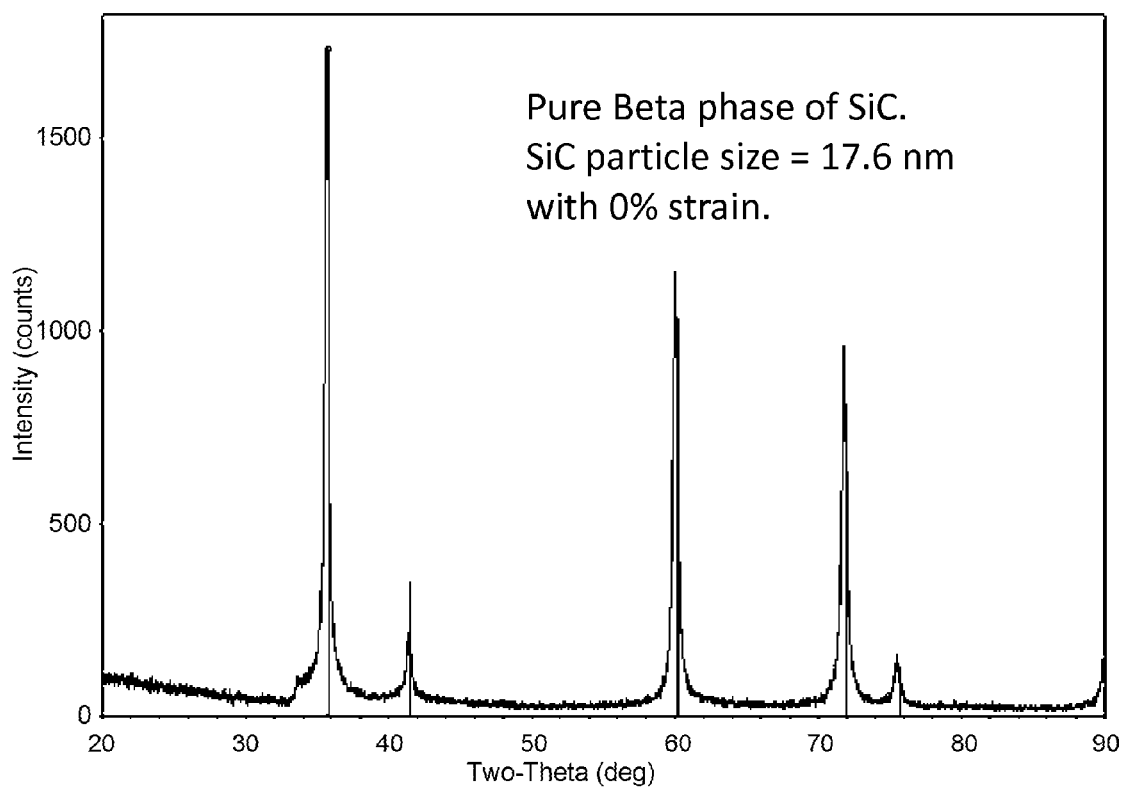
FIG. 14 shows an XRD of a sample containing nearly pure SiC nanoparticles.

Conversion to Polymeric Thermoset Solid Follow by Heat Treatment to Shaped Silicon Carbide-Silicon Matrix Solid Ceramic Composition by Heating to 1430° C. Under an Argon Atmosphere The pellet from Example 43 was heated under a flow (100 cc/min) of argon at 5° C./min to 250° C. and held at 250° C. for 1 hr (conversion to solid thermoset) followed by heating at 3° C./min to 1200° C. and holding at 1200° C. for 1 minute followed by heating at 1° C./min to 1405° C. and holding at this temperature for 1 hr, heating at 1° C./min to 1415° C. and holding at this temperature for 1 hr, at 1° C./min to 1415° C. and holding at this temperature for 1 hr and finally heating at 1° C./min to 1430° C. and holding at this temperature for 1 hr. Based on the original precursor composition of the pellet (85.6997 mg), the ceramic solid retained 90.14% by weight. Upon cooling, the SiC containing solid ceramic (FIG. 13) was found to be extremely hard. XRD analysis (FIG. 14) showed the formation of pure beta nanosized SiC (100%) with an average particle size of 17.6 nm and 0% strain. The experiment was designed to form basically pure SiC nanoparticles/nanostructures and for the reaction to occur slowly above the melting point of silicon to control the exothermic reaction involving the formation of silicon carbide.

EXAMPLE 45

Formulation of Precursor Composition of Silicon and TPEB Prepolymer Containing Chopped Fibers TPEB prepolymer from Example 34 (3.72 g; 7.78 mmol) and silicon (4.46 g; 158 mmol) were ball milled for 5 minutes resulting in a deep red-black fine powder. Chopped carbon fibers (1.00 g, ¼" length) were added and the solid mixture was placed in 100 mL of acetone and stirred for 6 hr. The solvent was removed and the solid mixture was placed in a 2½" pellet die and pressed to 10,000 pounds for 1 minute.

EXAMPLE 46

Conversion of Precursor Composition of Silicon and TPEB Prepolymer Containing Chopped Fibers to Thermoset The 2½" pellet from Example 45 was placed in a furnace, heated at 20° C./min under an argon atmosphere to 210° C., and held at this temperature for 10 hr (overnight) resulting in the formation of a tough shaped polymeric carbon fiber reinforced thermoset solid. The silicon powder was homogeneous dispersed in the solid thermoset-carbon fiber composite.

EXAMPLE 47

Figure 15:
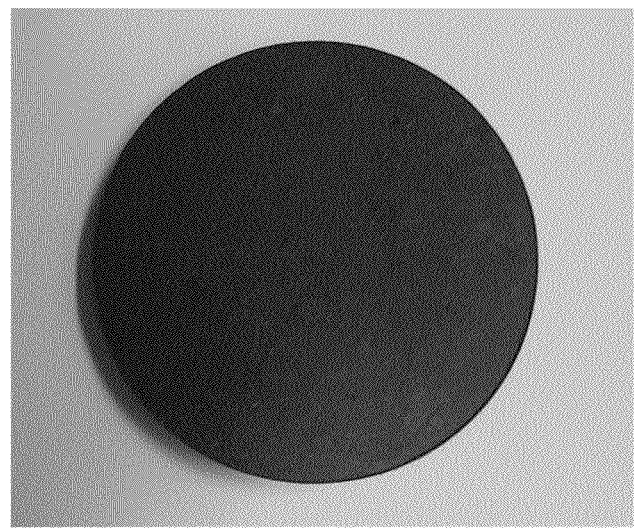
FIG. 15 shows a photograph of a carbon fiber-reinforced sample containing SiC nanoparticles.

Formation of Refractory Carbon Fiber Reinforced SiC Solid Ceramic in One Step by Heating at 2° C./Min to 1500° C. Under an Argon Atmosphere The carbon fiber-containing shaped polymeric thermoset pellet (15.7 g) from Example 46 was placed in a 3" tube furnace and heated at 2° C./min under a flow (100 cc/min) of argon to 1400° C. and held at 1400° C. for 5 minutes followed by heating at 0.2° C./min to 1500° C. and holding at 1500° C. for 2 hr yielding a solid dense carbon fiber reinforced ceramic (FIG. 15) with weight retention of 90%. Upon cooling, the solid carbon fiber reinforced ceramic was removed from the furnace, characterized by XRD, and found to form nanoparticle sized SiC in the carbon-carbon fiber composite. The SiC carbon-carbon fiber solid composition exhibited great structural integrity with the inclusion of the fiber reinforcement.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A composition comprising:
   elemental silicon; and
   an organic component selected from:
   an organic compound having a char yield of at least 60% by weight; and
   a thermoset made from the organic compound.

2. The composition of claim 1, wherein the organic compound:
   contains only carbon and hydrogen;
   contains aromatic and acetylene groups;
   contains only carbon, hydrogen, and nitrogen or oxygen;
   contains no oxygen; or
   contains a heteroatom other than oxygen.

3. The composition of claim 1, wherein the organic compound is 1,2,4,5-tetrakis(phenylethynyl)benzene or a prepolymer thereof, 4,4'-diethynylbiphenyl, N,N'-(1,4-phenylenedimethylidyne)-bis-(3-ethynylaniline), dianilphthalonitrile, or resorcinol phthalonitrile or a prepolymer thereof.

4. The composition of claim 1, wherein the composition further comprises:
   boron.

5. The composition of claim 1, wherein the composition further comprises:
   fibers, carbon fibers, ceramic fibers, or metal fibers.

6. The composition of claim 1, wherein the composition is a shaped component having the silicon dispersed in the thermoset.

7. A method comprising:
   combining elemental silicon and an organic compound having a char yield of at least 60% by weight to form a precursor mixture.

8. The method of claim 7, further comprising:
   placing the precursor mixture into a mold or shaped reactor.

9. The method of claim 7, further comprising:
   forming the precursor mixture into a shaped component.

10. The method of claim 7, further comprising:
    heating the precursor mixture in an inert atmosphere or vacuum at a temperature that causes polymerization of the organic compound to a thermoset to form a thermoset composition.

11. The method of claim 10, wherein heating the precursor mixture is performed at 150-600° C.

12. The method of claim 10, further comprising:
    heating the thermoset composition in an inert atmosphere, argon, nitrogen, or vacuum at a temperature that causes formation of a carbonized thermoset having silicon embedded therein.

13. The method of claim 12, wherein heating the thermoset composition is performed at 600-1400° C.

14. The method of claim 10, further comprising:
    heating the thermoset composition in an inert atmosphere, argon, nitrogen, or vacuum at a temperature that causes formation of a ceramic comprising nanoparticles of silicon carbide or silicon nitride in a carbonaceous matrix or silicon matrix.

15. The method of claim 14;
    wherein the precursor mixture further comprises boron; and
    wherein heating the thermoset composition causes formation of nanoparticles of silicon boron carbide.

16. The method of claim 14, wherein heating the thermoset composition is performed at 1400-1900° C.

17. The method of claim 14, wherein heating the thermoset composition is performed at greater than 1900° C.

18. The method of claim 14, wherein heating the thermoset composition is performed above the melting point of the silicon.

19. A method comprising:
    providing a precursor mixture of elemental silicon and an organic compound;
    heating the precursor mixture in an inert atmosphere or vacuum at elevated pressure and at a temperature that causes polymerization of the organic compound to a thermoset to form a thermoset composition; and
    heating the thermoset composition in an inert atmosphere, argon, nitrogen, or vacuum at a temperature that causes formation of a ceramic comprising nanoparticles of silicon carbide or silicon nitride in a carbonaceous matrix or silicon matrix;
    wherein the organic compound has a char yield of at least 60% by weight when heated at the elevated pressure.

* * * * *